United States Patent
Young et al.

(10) Patent No.: US 8,932,976 B2
(45) Date of Patent: Jan. 13, 2015

(54) PREPARATION OF CATALYST FOR BISPHENOLS PRODUCTION

(75) Inventors: Thomas C. Young, Lake Jackson, TX (US); David R. Brooks, Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 189 days.

(21) Appl. No.: 12/600,330

(22) PCT Filed: Jun. 3, 2008

(86) PCT No.: PCT/US2008/065636
§ 371 (c)(1),
(2), (4) Date: Nov. 16, 2009

(87) PCT Pub. No.: WO2008/157025
PCT Pub. Date: Dec. 24, 2008

(65) Prior Publication Data
US 2010/0152028 A1    Jun. 17, 2010

Related U.S. Application Data

(60) Provisional application No. 60/934,579, filed on Jun. 14, 2007.

(51) Int. Cl.
*B01J 37/30*    (2006.01)
(52) U.S. Cl.
CPC ........................ *B01J 37/30* (2013.01)
USPC ............................ 502/159; 528/196; 502/11
(58) Field of Classification Search
USPC ........................................ 528/196
See application file for complete search history.

(56) References Cited

U.S. PATENT DOCUMENTS

| | | | |
|---|---|---|---|
| 3,394,089 A | 7/1968 | McNutt et al. | |
| 5,759,942 A | 6/1998 | Tan et al. | |
| 6,723,881 B1 | 4/2004 | Bodiger et al. | |
| 7,141,640 B2 * | 11/2006 | Belfadhel et al. | 528/196 |
| 7,820,866 B2 * | 10/2010 | Fetsko et al. | 568/728 |
| 2004/0068085 A1 * | 4/2004 | Belfadhel et al. | 528/196 |

FOREIGN PATENT DOCUMENTS

| | | | |
|---|---|---|---|
| CN | 1061354 | | 5/1992 |
| GB | 1539463 | * | 7/1976 |
| JP | 06296871 | | 10/1994 |
| JP | 08040961 | | 2/1996 |
| JP | 10512797 | | 12/1998 |
| Jp | 2005-137950 | * | 6/2005 |
| WO | 0053315 | | 9/2000 |
| WO | 0174488 | | 10/2001 |
| WO | 0174489 | | 10/2001 |
| WO | 0194014 | | 12/2001 |
| WO | 2005102520 | | 2/2005 |
| WO | 2005021155 | | 3/2005 |
| WO | 2005023424 | | 3/2005 |
| WO | 2005042154 | | 5/2005 |

OTHER PUBLICATIONS

Helfferich, "Ion Exchange", Dover Publications, New York, 1995, Section 5-2, p. 100.

* cited by examiner

*Primary Examiner* — Melvin C Mayes
*Assistant Examiner* — Colette Nguyen
(74) *Attorney, Agent, or Firm* — Brooks, Cameron & Huebsch, PLLC

(57) ABSTRACT

An improved method of preparing an ion exchange resin catalyst by partial neutralization of the ion exchange resin catalyst with a promoter. The promoter and a fluid are introduced into a vessel or a reactor which is partially filled with the ion exchange resin catalyst forming an ion exchange resin catalyst bed in the vessel or reactor. The fluid and the promoter are recirculated in an upflow direction at a velocity sufficient to partially fluidize the ion exchange resin catalyst bed and to achieve a rapid uniform distribution of the promoter throughout the catalyst bed.

16 Claims, No Drawings

PREPARATION OF CATALYST FOR BISPHENOLS PRODUCTION

CROSS REFERENCE TO RELATED APPLICATIONS

This is a §371 application of PCT International Patent Application Number PCT/US2008/065636 filed Jun. 3, 2008, and claims priority from Provisional Application Ser. No. 60/934,579 filed Jun. 14, 2007, each of which is incorporated herein by reference in its entirety.

BACKGROUND OF THE INVENTION

1. Field of the Invention

The present invention relates to a method of preparing ion exchange resin catalyst by partial neutralization of the catalyst with a promoter in a vessel or a reactor. The catalysts may be useful for producing bisphenols (e.g. bisphenol-A).

2. Description of Background and Related Art

Bisphenol-A, in general, is produced by a reaction of phenol and acetone using an ion exchange resin catalyst (e.g. a cation exchange resin catalyst) that has been partially neutralized with a promoter (e.g. an aminomercaptan promoter).

Partial neutralization (e.g. less than 100% neutralization) of the ion exchange resin catalyst, sometimes referred to as "promotion", can be accomplished by slowly adding the promoter to a well-agitated vessel or reactor containing the ion exchange resin catalyst and a fluid (e.g. water) to evenly distribute the promoter throughout the vessel or reactor. However, many bisphenol-A production plants do not have a well-agitated vessel for this purpose. Instead, various known techniques are used to add the promoter to the ion exchange resin catalyst in a fixed catalyst bed reactor immediately prior to use of the reactor for the bisphenol-A production. The promoter typically is bound to the ion exchange resin catalyst in a fixed catalyst bed reactor by an acid-base neutralization reaction or by an ion exchange process if the promoter is introduced as a salt instead of a base. Since both the acid-base neutralization reaction and the ion exchange process take place very rapidly, it is difficult to obtain an even or a uniform distribution of the promoter throughout the fixed catalyst bed using these methods.

GB 1 539 463 describes a partial neutralization of a cation exchange resin catalyst with a mercaptoamine promoter by passing a solution of the mercaptoamine (or the salt of the mercaptoamine) through a fixed catalyst bed reactor and then passing water through the fixed catalyst bed in a downflow direction for a sufficient period of time to distribute the mercaptoamine throughout the catalyst bed. GB 1 539 463 does not describe the flow rates, promoter addition rates, or acid concentrations in the water needed to provide a rapid and even distribution of the promoter.

JP 06-296871 describes a method to fill a reactor with a catalyst for manufacturing bisphenol-A which includes (i) a step to fill the reactor with an unmodified resin catalyst to form an unmodified resin catalyst filled layer in the reactor, and (ii) a step for preparing the resin catalyst by allowing a part of the unmodified resin catalyst to react with a phenol solution with sulfur-containing ammonium salt in an acidified water. JP 06-296871 does not teach recirculating the acidified fluid back to the reactor. Instead, JP 06-296871 teaches the "expelling" the water from the reactor after the water has passed through the resin catalyst layer. Therefore, JP 06-296871 discloses a one-pass method of promotion.

WO 2001-094014 describes a promotion of a catalyst in a reactor. The promotion is achieved by passing a solution of a promoter, an acid and water through the reactor. The solution contains a ketone in the water.

WO 2000-053315 and WO 2005-042154 describe injecting air or inert gas bubbles into the bottom or sides of a reactor to mix a catalyst bed while a promoter is being introduced into the reactor or after a promoter is added to the reactor.

WO 2005-021155 describes a promotion of a reactor by circulating a solution of a promoter and an acid in water through the reactor until "an equilibrium is obtained." The equilibrium requirement is not clearly defined in WO 2005-021155.

WO 2005-102520 describes the use of a promoter, recovered from bisphenol plant wastewater, for promoting a catalyst bed.

U.S. Pat. No. 3,394,089 describes the addition of mercaptoalkylamines in an un-neutralized or salt form to a stirred aqueous slurry of ion exchange resin catalyst to obtain an evenly distributed and partially neutralized catalyst.

U.S. Pat. No. 6,723,881 describes the use of a separate agitated vessel for a promoter addition to a catalyst, followed by transferring the catalyst into a fixed bed reactor.

In summary, the prior art does not provide conditions under which rapid and even distribution of a promoter throughout an ion exchange resin catalyst bed can be obtained. The methods disclosed in the prior art would result in the use of extra equipment, longer production time, and/or higher production costs.

Therefore, there is a need in the industry for an improved method of preparing an ion exchange resin catalyst that provides an even distribution of a promoter throughout an ion exchange resin catalyst bed in a rapid manner and without a separate mixing vessel or the addition of gases as described in the prior art.

SUMMARY OF THE INVENTION

The present invention is directed to a method of preparing an ion exchange resin catalyst. The method comprises (a) partially filling a vessel with an ion exchange resin catalyst to form an ion exchange resin catalyst bed in the vessel, (b) introducing a fluid into the vessel, (c) recirculating the fluid though the ion exchange resin catalyst bed in an upflow direction, (d) introducing a promoter into the recirculating fluid, and (e) maintaining the recirculating fluid at a velocity sufficient to evenly distribute the promoter throughout the ion exchange resin catalyst bed.

In one embodiment of the present invention, the fluid in the vessel is maintained at a velocity sufficient to achieve at least about 5% catalyst bed expansion. In this manner, uniform distribution of the promoter can rapidly be achieved.

In another embodiment of the present invention, the vessel may be partially filled with the ion exchange resin catalyst, for example the vessel may be about 50% to about 95% filled with the catalyst, before the fluid is introduced to the vessel. Then, the promoter may be introduced to the vessel in a sufficient quantity to partially neutralize the ion exchange resin catalyst.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

The present invention provides a method of preparing an ion exchange resin catalyst by partial neutralization of the catalyst with a promoter in a vessel or reactor. The promoter is introduced into the vessel or the reactor, which is partially filled with the ion exchange resin catalyst to form an ion exchange resin catalyst bed. A fluid (e.g. water or acidified water) is introduced to the catalyst bed and recirculated though the catalyst bed, preferably in an upflow direction. The recirculating fluid is maintained at a velocity sufficient to at least partially fluidize the ion exchange resin catalyst bed and to evenly distribute the promoter rapidly throughout the catalyst bed.

After a careful investigation of the fundamental phenomena governing the dispersion of the promoter in an ion exchange resin catalyst fixed bed, it is found that the main dispersion mechanism is directly related to the catalyst particle movement due to partial fluidization of the catalyst fixed bed. Without limiting the present invention to any one theory, it is theorized that maintaining sufficient upflow velocity of the recirculating fluid (1) provides expansion and at least partially fluidization of the catalyst bed and (2) promotes adequate mixing of the catalyst particles and the promoter. As a result, overpromoted catalyst particles are in close contact with underpromoted catalyst particles. Proper acidification of the fluid (e.g. water) can also improve the mobilization of the promoter (e.g which becomes a protonated promoter in the acidified water) between the adjacent catalyst particles by increasing the efficiency of the ion exchange of the protonated promoter between the catalyst particles and the fluid.

Thus, it is important to distribute the promoter throughout the catalyst bed by recirculating the fluid and the promoter in an upflow direction, and maintaining the fluid at a sufficient velocity to partially fluidize the catalyst bed. Using this method, rapid and uniform distribution of the promoter throughout the catalyst bed can be achieved.

The ion exchange resin catalyst used in the present invention may be a cation exchange resin in an acidic form. Preferably, the cation exchange resin used in the present invention has a sulfonic acid group. Examples of the cation exchange resin include a sulfonated styrene/divinylbenzene copolymer resin, sulfonated crosslinked styrene resin, phenol-formaldehyde-sulfonic acid resin, and benzene-formaldehyde-sulfonic acid resin, and any mixture thereof.

Examples of commercially available cation exchange resin catalysts useful in the present invention include DOWEX™ 50WX4, DOWEX™ 50WX2, DOWEX™ M-31, DOWEX™ MONOSPHERE M-31, DOWEX™ DR-2030 and DOWEX™ MONOSPHERE DR-2030 catalysts, manufactured and marketed by The Dow Chemical Company, and any mixture thereof.

Other examples of commercially available ion exchange resin catalysts useful in the present invention may include Diaion™ SK104, Diaion™ SK1B, Diaion™ PK208, Diaion™ PK212 and Diaion™ PK216 manufactured by Mitsubishi Chemical Industries, Limited; Amberlyst™-31, Amberlyst™-121, Amberlyst™-232 and Amberlyst™-131 manufactured by Rohm & Haas; T-38, T-66 and T-3825 manufactured by Thermax; Lewatit™ K1131, Lewatit™ K1131S, Lewatit™ K1221, Lewatit™ K1261 and Lewatit™ SC104 manufactured by Lanxess; Indion™ 140, Indion™ 130, Indion™ 180 and Indion™ 225 manufactured by Ion Exchange India Limited; and Purolite™ CT-124, Purolite™ CT-222 and Purolite™ CT-122 manufactured by Purolite, and any mixture thereof.

The promoter used in the present invention may be any promoter of the bound promoter type. "Bound promoter" means a promoter that contains at least one basic functionality, such as an amino group, that "fixes" the promoter on the catalyst by an acid-base reaction. It is distinguished from the "free" or "soluble" promoters, which do not have the basic functionality. This type of free or soluble promoters is usually dissolved in a condensation reaction medium (e.g. a mixture of phenol, acetone and bisphenol) and may be used as a fluid which is fed into the vessel or reactor during the production of bisphenol A.

Examples of the suitable promoters useful in the present invention include an aminoalkanethiol, an alkyl-aminoalkanethiol, a dialkyl-aminoalkanethiol, a thiazolidine, an aromatic mercaptoamine, a mercaptoalkylamide, a pyridinealkanethiol, a mercaptoalkyl phenylpyridine, a N-alkyl-N-mercaptoalkyl-mercaptoalkylaniline, a dimercaptoalkyl pyridine, a mercaptoalkyl-benzylamine, a aminothiophenol, a pyridine alkyl thioester, a pyridine alkyl sulfide, an imidizole alkyl thiol, an imidizole alkyl thioester, an imidizole alkyl sulfide, a phthalimidine alkyl thiol, a phthalimidine alkyl thioester, a polysulfur thioalkyl pyridine, a polysulfur thiopyridine, a polysulfur thio benzothiazole, a polysulfur thio imidizole, a polysulfur thio benzimidizole, and any mixture thereof; or other compound that contains one or more thiol and/or sulfide functionalities and a basic functionality suitable for attachment to a cation exchange resin by an ionic bond. Examples of the one or more thiol and/or sulfide functionalities include functionalities of a R—S—R and a R—SH. The acid salt forms of any of the promoters listed above, such as aminoethanethiol-HCl, may also be used. For some promoters, the acid salt form is preferred, since it is often more soluble in water.

More specifically, examples of aminoalkane thiol include aminoethanethiol, aminopropanethiol, aminobutanethiol, aminopentanethiol, and any mixture thereof or the like.

Examples of a pyridine alkane thiol include 4-pyridine methane thiol, 3-pyridine methane thiol, 2-(4-pyridyl)ethane thiol, 2-(2-pyridyl)ethane thiol, 2-(3-pyridyl)ethane thiol, 3-(4-pyridyl)propane thiol, 3-(3-pyridyl)propane thiol, 3-(4-pyridyl)propane thiol, 4-(4-pyridyl)butane thiol, 4-(3-pyridyl)butane thiol, 4-(2-pyridyl)butane thiol, and any mixture thereof or the like.

Examples of a thiazolidine include 2,2-dimethylthiazolidine, 2-methyl-2-phenylthiazolidine, 3-methylthiazolidine, 2-methyl-2-ethylthiazolidine, 2,2-(pentamethylene)thiazolidine, 2-methyl-2-dodecylthiazolidine, 2-methyl-2-carbethoxymethylthiazolidine, 2,2,4,5-tetramethylthiazolidine, 2,2,3-trimethylthiazolidine, 2,2-dimethyl-3-octylthiazolidine, 2-methyl-2-ethyl-3-aminoethylthiazolidine, 2-cyclohecylthiazolidine, and any mixture thereof or the like.

Examples of an aminothiophenol include 1,4-aminothiophenol, and any mixture thereof or the like.

Examples of an alkylaminoalkanethiol include propylaminopropanethiol, propylaminobutanethiol, propylaminoethanethiol, and any mixture thereof or the like.

Examples of a dialkylaminoalkanethiol include dimethylaminoethanethiol, ethyl cyclohexylaminobutanethiol, and any mixture thereof or the like.

Examples of a mercaptoalkylamide include n-(2-mercaptoethyl)propionamide or the like.

Examples of a mercaptoalkyl phenylpyridine include 2-(4-mercapto methyl phenyl)pyridine, 3-(4-mercapto methyl phenyl)pyridine, 4-(4-mercapto methyl phenyl)pyridine, 2-(3-mercapto methyl phenyl)pyridine, 3-(3-mercapto methyl phenyl)pyridine, 4-(3-mercapto methyl phenyl)pyridine, 2-(2-mercapto methyl phenyl)pyridine, 3-(2-mercapto methyl phenyl)pyridine, 4-(2-mercapto methyl phenyl)pyridine, 2-(4-(2-mercapto ethyl)phenyl)pyridine, 3-(4-(2-mercapto ethyl)phenyl)pyridine, 4-(4-(2-mercapto ethyl)phenyl)pyridine, 2-(3-(2-mercapto ethyl)phenyl)pyridine, 3-(3-(2-mercapto ethyl)phenyl)pyridine, 4-(3-(2-mercapto ethyl)phenyl)pyridine, 2-(2-(2-mercapto ethyl)phenyl)pyridine, 3-(2-(2-mercapto ethyl)phenyl)pyridine, 4-(2-(2-mercapto ethyl)phenyl)pyridine, and any mixture thereof or the like.

Examples of a N-alkyl-n-mercaptoalkyl-mercaptoalkylaniline include n-(2-mercaptoethyl)-4-(2-mercaptoethyl)aniline, n-(2-mercaptoethyl-n-methyl-4-(2-mercaptoethyl)aniline, n-ethyl-n-(2-mercaptoethyl)-4-(2-mercaptoethyl)aniline, n-(2-mercaptopropyl)-4-(2-mercaptoethyl)aniline, n-(2-mercaptopropyl)-n-methyl-4-(2-mercaptoethyl)aniline, n-ethyl-n-(2-mercaptopropyl)-4-(2-mercaptoethyl)aniline, n-(2-mercaptoethyl)-4-(2-mercaptopropyl)aniline, n-(2-mercaptoethyl)-n-methyl-4-(2-mercaptopropyl)aniline, n-ethyl-n-(2-mercaptoethyl)-4-(2-mercaptopropyl)aniline, n-(2-mercaptopropyl)-4-(2-mercaptopropyl)aniline, n-(2-mercaptopropyl)-n-methyl-4-(2-mercaptopropyl)aniline, n-ethyl-n-(2-mercaptopropyl)-4-(2-mercaptopropyl)aniline, and any mixture thereof or the like.

Examples of a dimercaptoalkyl pyridine include 3,5-di-(2-mercaptoethyl)pyridine, 2,5-di-(2-mercaptoethyl)pyridine, 2,6-di-(2-mercaptoethyl)pyridine, 3,5-di-(2-mercaptopropyl)pyridine,2,5-di-(2-mercaptopropyl)pyridine, 2,6-di-(2-mercaptopropyl)pyridine, and any mixture thereof or the like.

Examples of a pyridine alkyl thioester include 2-(2'-thioacetate ethyl)pyridine, 4-(2'-thioacetate ethyl)pyridine, pyridine alkyl sulfides 2-(2'-tert-butylthioethyl)pyridine, 4-(2'-tert-butylthioethyl)pyridine, and any mixture thereof or the like.

Examples of an imidizole alkyl thiol include 2-mercaptoethylbenzimidazole, or the like.

Examples of an imidizole alkyl thioester include n,s-di-acetyl-2-mercaptoethylbenzimidazole, or the like.

Examples of a phthalimidine alkyl thiol include n-(2'-mercaptoethyl)-phthalimidine, or the like.

Examples of a phthalimidine alkyl thioester include s-acetyl-n-(2'-mercaptoethyl)-phthalimidine, or the like.

Examples of a polysulfur thioalkyl pyridine include 2-(3'-tert-butylthiopropylthioethyl)pyridine, 4-(6'-tert-butylthiohexylthioethyl)pyridine, 4-(4'-tert-butylthiobutylthioethyl)pyridine, 4-(5'-tert-butylthiopentylthioethyl)pyridine, 4-(3'-tert-butylthiopropylthioethyl)pyridine, and any mixture thereof or the like.

Examples of a polysulfur thiopyridine include 2-(6'-tert-butylthiohexylthio)pyridine, 2-(4'-tert-butylthiobutylthio)pyridine, 2-(5'-tert-butylthiopentylthio)pyridine, 2-(3'-tert-butylthiopropylthio)pyridine, 4-(3'-tert-butylthiopropylthio)pyridine, and any mixture thereof or the like.

Examples of a polysulfur thio benzothiazole include 2-(6'-tert-butylthiohexylthio)benzothiazole, 2-(5'-tert-butylthiopentylthio)benzothiazole, 2-(4'-tert-butylthiobutylthio)benzothiazole, 6-ethoxy-2-(3'-tert-butylthiopropylthio)benzothiazole, 2-(3'-tert-butylthiopropylthio)benzothiazole, and any mixture thereof or the like.

Examples of a polysulfur thio imidizole and thio benzimidizole include 1-methyl-2-(3'-tert-butylthiopropylthio)imidizole, 2-(6'-tert-butylthiohexylthio)benzimidizole, 2-(5'-tert-butylthiopentylthio)benzimidizole, 2-(4'-tert-butylthiobutylthio)benzimidizole, 2-(3'-tert-butylthiopropylthio)benzimidizole, 5-methyl-2-(3'-tert-butylthiopropylthio)benzimidizole hydrochloride, and any mixture thereof or the like.

Most preferably, the promoter useful in the present invention may be one of the 2,2'-dimethylthiazolidine, aminoethanethiol, and 4-pyridine ethane thiol or its isomer, and any mixture thereof or the like.

The promoter may be added to the vessel or the reactor in a sufficient quantity to partially neutralize the ion exchange resin catalyst. Partial neutralization means that a part of the acid groups on the ion exchange resin catalyst are neutralized with the promoter. Preferably, from about 5% to about 50% of the acid groups are neutralized. More preferably, from about 10% to about 30% of the acid groups are neutralized.

The fluid used in the present invention may be water, more preferably, acidified water. Any inorganic acid or organic acid may be added to the water to form the acidified water. The inorganic and organic acid may include, for example, HCl, $H_2SO_4$, phosphoric acid, alkyl sulfonic acids, aromatic sulfonic acids, formic acid, acetic acid, oxalic acid, and any combination thereof. Phosphoric acid is a preferred example of the acid useful in the present invention.

The acid concentration in the water may be from about 0.001 to about 5 molar, preferably from about 0.005 to about 1 molar, and most preferably from about 0.01 to about 0.5 molar.

In addition, the molar concentration of the promoter in the acidified water fed to the vessel or reactor is preferably less than the molar concentration of the acid in the water so that the basic group (e.g. amino functionality) on the promoter is neutralized by the acid in the water before the neutralized promoter contacts the ion exchange resin catalyst.

The promoter binds to the ion exchange resin catalyst by an acid-base neutralization reaction or by an ion exchange process. In the absence of any acid in the fluid (e.g. water), the basic group in the promoter is directly neutralized by the acid group on the ion exchange resin catalyst. If the acidified water is used, the acid in the water neutralizes the basic group in the promoter and then the neutralized promoter (the protonated promoter) attaches to the catalyst by ion exchange.

Both direct neutralization and ion exchange processes work well for introducing the promoter to the catalyst. Some promoters may have a relatively low solubility in water. However, the acid salt of this type of promoter is usually easy to dissolve. Thus, proper acidification of the fluid (e.g. water) can improve the solubility of the promoter so that the promoter-water mixture will be a single phase. Use of a single phase mixture is preferable for introducing the promoter into the reactor to ensure even distribution of the promoter across the cross-section of the reactor.

According to the present invention, it is important to maintain the fluid at a velocity sufficient to achieve a high catalyst bed expansion and rapid uniform distribution of the promoter throughout the catalyst bed. Preferably, the velocity of the fluid is sufficient to achieve at least about 5% of the catalyst bed expansion; more preferably, from about 5% to about 100% of the catalyst bed expansion; and most preferably, from about 10% to about 30% of the catalyst bed expansion. In general, the velocity of the recirculating fluid, which is sufficient to achieve high bed expansion, may be within the range of from about 0.1 m/hr to about 100 m/hr; more preferably, from about 0.5 m/hr to about 50 m/hr; and most preferably, from about 1 m/hr to about 20 m/hr.

A bed expansion of a catalyst bed is generally governed by principles related to a velocity of settling of catalyst particles in a fluid. Factors, such as fluid viscosity, fluid density, catalyst particle density and catalyst particle diameter (size), all have a significant influence on the velocity of the settling of the catalyst particles. These factors significantly affect the bed expansion. With water being the commonly used fluid for preparing ion exchange resin catalysts, the fluid viscosity and fluid density is generally the same, the catalyst particle density may change slightly. However, the size of the catalyst particles may change significantly among different catalysts. Some catalysts may contain a distribution of different particle sizes, others may have a relatively uniform particle size. Thus, catalysts with different particle size may require different water velocities to achieve the same high catalyst bed expansion. Catalysts with smaller particle size may require lower water velocities to achieve the same high catalyst bed expansion than catalysts with larger particle size. For example, for catalysts such as Dowex™ 50WX4, a preferred velocity range to obtain a 5% to 100% bed expansion may be from about 3 m/hr to about 29 m/hr at about 22° C. For catalysts such as Amberlyst™ including Amberlyst™ 31WET, 121WET, and 232WET, a preferred velocity range to obtain a 5% to 100% bed expansion may be from about 1 m/hr to about 14 m/hr at 30° C. For catalysts such as Amberlyst™ 131WET, a preferred velocity range to obtain a 5% to 100% bed expansion may be from about 2 m/hr to about 22 m/hr at 30° C.

Bed expansion is also dependent on temperature, mainly due to the significant dependence of the fluid viscosity on temperature. For example, the bed expansion may be about 30% to about 35% lower at 50° C. than at 30° C., and about 50% to about 60% lower at 70° C. than at 30° C. The operation temperature for preparing the ion exchange resin catalyst in the present invention may be in the range of from about 0° C. to about 100° C., preferably from about 10° C. to about 70° C., and more preferably from about 20° C. to about 50° C.

According to one embodiment of the present invention, the vessel or reactor may be partially filled with the ion exchange resin catalyst, leaving sufficient room in the vessel or reactor to allow for a partial expansion of the catalyst bed. For example, the vessel or reactor may be from about 50% to about 95% filled with catalyst, and more preferably about 70% to about 90% filled with catalyst. The fluid is introduced to the vessel or reactor in an upward direction. The fluid is recirculated through the catalyst bed and is maintained at a velocity sufficient to partially expand the catalyst bed and to achieve at least about 5% of the catalyst bed expansion. The recirculating fluid means that the fluid leaving the vessel or reactor is reintroduced to the inlet of the vessel or the reactor. The bed expansion is measured as a function of the fluid velocity for the ion exchange resin catalyst used in the vessel or reactor. Detailed measurements and calculations are described in the following Example 1.

Optionally, the recirculating fluid may be passed through a filter to remove catalyst fines, a surge drum to allow level control, a pump, and/or other equipment before the fluid is reintroduced to the inlet of the vessel or reactor.

The filter used to remove catalyst particles or other solids from the recirculating fluid may be a bag filter, a cartridge filter, or another type of filter. Selection of an appropriate type of filter to remove solids from a liquid is well within the expertise of one skilled in the art of the engineering of chemical production plants.

The surge drum may be used to manage the fluid level. When the fluid is recirculated through the vessel or reactor, the fluid usually occupies the entire volume of the vessel or reactor or sometimes overflows out the top of the vessel or reactor. In addition, the promoter added to the vessel or reactor usually adsorbs onto the catalyst and thus decreases the amount of volume available for the recirculating fluid in the vessel or reactor. The use of the surge drum allows a variable fluid level, for example, when the promoter is added, the level in the surge drum will rises to take up the excess fluid if needed.

The pump used to recirculate the acidified water through the catalyst bed may be a centrifugal pump or any other type of pump. Selection of an appropriate type of pump for this application is also well within the expertise of one skilled in the art of the engineering of chemical production plants.

Other equipment useful in the present invention may include a flow control valve, a flowmeter, and temperature and pressure measurement devices, well known to those skilled in the art.

There are various ways to introduce the promoter into the vessel or reactor. The promoter may be introduced simultaneously with the fluid into the vessel or reactor as two separate streams, introduced to the fluid prior to the introduction of the fluid into the vessel or the reactor, or introduced to the fluid after the introduction of the fluid into the vessel or the reactor. For example, the promoter may be added to the recirculating fluid while the recirculating fluid is maintained at a sufficient upflow velocity. The fluid continues to recirculate through the vessel or reactor with the promoter at the same velocity until the promoter is evenly distributed throughout the bed. The fluid is then discharged from the vessel or reactor. Alternatively, a pre-prepared fluid containing the promoter may be fed directly to the vessel or reactor instead of adding the promoter to the recirculating fluid. Once promoter addition is complete, the fluid and the promoter are recirculated through the vessel or reactor and maintained at a sufficient upflow velocity until the promoter is evenly distributed throughout the bed. The fluid is then discharged from the vessel or reactor.

The promoter may be added to the fluid in one or more steps. The addition time of the promoter may be from about 0.5 hour to about 5 days, and more preferably, from about 4 hours to about 1.5 days.

There are various methods to measure the distribution of the promoter to determine if the promoter is evenly distributed throughout the catalyst bed. One method, for example, is to first take a catalyst sample from one or more points within the catalyst bed. The samples are then analyzed for promoter content to determine the uniformity of the neutralization of the catalyst. The results can be used to determine if the promotion has been evenly distributed throughout the catalyst bed.

When the percent neutralizations are measured at several points of the catalyst bed (e.g. several points at evenly-spaced heights of the catalyst bed), the uniformity of the neutralization of the catalyst can be determined by comparing the percent neutralization measured at each of the several points of the catalyst bed and the average percent neutralization obtained from the several points of the catalyst bed. For example, if the percent neutralization at three different points of a catalyst bed are 15%, 20%, and 25%, the average percent neutralization from these three different points is 20%. Accordingly, the difference between the percent neutralization at the three different points of the catalyst bed from the average percent neutralization are −5%, 0%, and +5%. Thus, the percent neutralization at the three different points are all within +/−5% of the average percent neutralization.

The promoter is generally considered evenly distributed through out the catalyst bed when the percent neutralization measured at the several points of the catalyst bed are all generally within +/−10% of the average percent neutralization; preferably, within +/−5% of the average percent neutralization; and more preferably, within +/−3% of the average percent neutralization.

In addition, the following individual steps may be added to the process of the present invention. These following steps are optional and may be separately done as desired:

(1) the ion exchange resin catalyst may be pre-rinsed with fluid to remove unwanted components from the catalyst; or (2) the partially-neutralized ion exchange resin catalyst may also be rinsed with fluid to remove acid and unabsorbed promoter from the catalyst bed after the promotion of the ion exchange resin catalyst has been achieved.

The following examples and comparative examples further illustrate the present invention in detail but are not to be construed to limit the scope thereof.

Example 1

In this example, ion exchange resin catalyst bed expansion, which is a function of upflow water velocity, was measured in a glass cylinder reactor. The glass cylinder had an inside diameter of 1 inch and a total height of 24 inches. The glass cylinder was carefully oriented vertically, and was fitted with end fittings containing frits to ensure even flow distribution.

Water-wet Dowex™ 50WX4 cation exchange resin catalyst (supplied from The Dow Chemical Company) was loaded into the glass cylinder reactor to a height of 13.75 inches. The reactor was then filled with water. The water was circulated and recirculated through the reactor in an upflow direction. The flowrate of the water was measured by collecting the circulating or recirculating water in a container for a period of time and then measuring the volume. The operation temperature was at room temperature (about 20° C. to 25° C.).

The expanded height of the ion exchange resin catalyst bed ("Expanded Bed Height") at a given flowrate was measured by observing the top level of the resin catalyst bed in the glass cylinder during the flow of water and using a ruler to measure the top level of the resin catalyst bed in the reactor. The bed expansion of the catalyst bed ("Bed Expansion") can be calculated using the following Formula (1):

Bed Expansion (%)=[(Expanded Bed Height/Base Bed Height)−1]×100   Formula (1):

The "Base Bed Height" is the original height of the catalyst bed when the flowrate is zero.

The above procedure for this example was repeated using several different flowrates. The results of this example including flowrate, velocity, bed height and percent bed expansion are shown in Table 1.

In Table 1, the flowrate is a volumetric flowrate and was measured in $cm^3$/min. Volumetric flowrate was converted to velocity by dividing the volumetric flowrate by the cross-sectional area of the glass cylinder reactor. The formula for calculating the velocity is V=F/A, wherein V is velocity, F is volumetric flowrate and A is cross-sectional area ($A=\pi D^2/4$); or, including the units in the formula, the velocity can be calculated by the following Formula (2):

$V$(m/hr)=$F$($cm^3$/min)/$A$($cm^2$)/(100 cm/m)×(60 min/hr)   Formula (2):

The data in Table 1 shows that the bed expansion of the ion exchange resin catalyst throughout the reactor increased as the upflow velocity was increased. The bed expansion increased more rapidly when the flowrate was above 30 ml/min. No bed expansion was observed when the flowrate was less than about 10 ml/min, which indicated that the bed expansion occurs only at a sufficiently high velocity.

TABLE 1

Ion Exchange Resin Catalyst Bed Expansion with Upflow Velocity

| Flowrate (ml/min) | Velocity (m/hr) | Bed Height (in) | Bed Expansion (%) |
|---|---|---|---|
| 0 | 0 | 13.75 | 0.00% |
| 10 | 1.18 | 13.75 | 0.00% |
| 20 | 2.37 | 14.38 | 4.50% |
| 30 | 3.55 | 14.38 | 4.50% |
| 40 | 4.74 | 15.13 | 10.00% |
| 50 | 5.92 | 15.75 | 14.50% |
| 60 | 7.1 | 16.13 | 17.30% |
| 70 | 8.29 | 16.75 | 21.80% |
| 80 | 9.47 | 17.38 | 26.40% |
| 90 | 10.66 | 18 | 30.90% |
| 100 | 11.84 | 18.75 | 36.40% |

Example 2

In this example, the dispersion time of ion exchange resin catalyst beads or particles, which is a function of upflow water velocity, was measured in a glass cylinder reactor.

The same type of glass cylinder reactor and test procedures described in Example 1 were used. The glass cylinder reactor was filled with dyed Dowex™ 50WX4 cation exchange resin catalyst to a height of 3.75 inches. The resin catalyst was dyed with very small concentrations of methylene blue dye before the resin catalyst was added in the glass cylinder reactor. The resin catalyst bead or particle swelling and density in the water were unaffected by the amount of dye present. The glass cylinder reactor was filled with additional undyed Dowex™ 50WX4 cation exchange resin catalyst to a height of approximately 12.3-12.5 inches. The glass cylinder reactor was then filled with water. The water was circulated and recirculated through the glass cylinder reactor in an upflow direction. The time required for the dyed ion exchange resin catalyst to disperse uniformly throughout the entire catalyst bed was measured. The base height and the expanded height of the ion exchange resin catalyst bed were also measured.

The above procedure of this example was repeated using several different upflow flowrates. The results of this example including the flowrate, velocity, bed expansion and dispersion times are listed in Table 2.

The data in Table 2 shows that the time required for the ion exchange resin catalyst to disperse throughout the reactor decreases rapidly as the upflow velocity was increased. The results in Table 2 confirmed that the dispersion of the resin catalyst beads or particles throughout the reactor increased rapidly as the upflow velocity was increased. The results also showed that no catalyst particles dispersion was occurred at 20 ml/min flowrate and no bed expansion observed at this flowrate. The results confirm that the dispersion of the catalyst beads or particles occurred rapidly only at a sufficiently high velocity.

TABLE 2

Ion Exchange Resin Catalyst Dispersion with Upflow Velocity

| Flowrate (ml/min) | Velocity (m/hr) | Base Bed Height (in) | Expanded Bed Height (in) | Bed Expansion (%) | Dispersion Time (min) |
|---|---|---|---|---|---|
| 20 | 2.37 | 12.38 | 12.38 | 0.00% | No dispersion |
| 30 | 3.55 | 12.31 | 13.13 | 6.70% | 131 |
| 40 | 4.74 | 12.31 | 13.63 | 10.70% | 31 |
| 50 | 5.92 | 12.75 | 14.38 | 12.80% | 18 |

Example 3

In this example, the uniformity of promotion of an ion exchange resin catalyst was measured as a function of fluid velocity in a glass cylinder reactor.

The same type of glass cylinder reactor and test procedure described in Example 1 were used. The glass cylinder was filled with water-wet Dowex™ 50WX4 cation resin catalyst to a height of 20 inches. The glass cylinder was then filled with water that had been acidified with phosphoric acid at a concentration of 0.1 moles/liter. The acidified water (1000 ml) was recirculated through the glass cylinder reactor in the upflow direction at a flowrate of 50 ml/min. The promoter comprising 11.53 g of dimethylthiazolidine was added to the acidified water.

The acidified water containing the promoter was passed through the ion exchange resin catalyst bed at 50 ml/min upflow rate. The acidified water was continuously recirculated through the ion exchange resin catalyst bed and was maintained at 50 ml/min upflow flowrate.

The same upflow flowrate was used for the introduction of the dimethylthiazolidine solution and for the recirculating of the acidified water. The acidified water was allowed to recirculate for 4 hours after the promoter addition ended. The flow was then shut off, and the glass cylinder reactor was emptied of water. Ion exchange resin catalyst samples were taken from the glass cylinder reactor at six evenly-spaced heights of the catalyst bed while the ion exchange resin catalyst was unloaded from the reactor.

These samples were washed with deionized water and titrated with standardized sodium hydroxide to determine the percent of catalyst neutralization. The results of this example are listed in Table 3. The data including flowrate, velocity, flow direction, and bed expansion are also listed in Table 3.

Example 4

Example 3 was repeated, except that an upflow flowrate of 30 ml/min was used. The results are also shown in Table 3.

Comparative Example A

Example 3 was repeated, except that an upflow flowrate of 10 ml/min was used. The results are also shown in Table 3. No bed expansion was observed during this experiment.

Comparative Example B

Example 3 was repeated, except that a flowrate of 50 ml/min was used and at a downflow direction. The results are also shown in Table 3. No bed expansion was observed during this experiment.

TABLE 3

Ion Exchange Resin Catalyst Neutralization by Dimethylthiazolidine

| Example No. | 3 | 4 | Comp. Ex. A | Comp. Ex. B |
|---|---|---|---|---|
| Flowrate (ml/min) | 50 | 30 | 10 | 50 |
| Velocity (m/h) | 5.92 | 3.55 | 1.18 | 5.92 |
| Flow Direction | Up | Up | Up | Down |
| Bed Expansion | 14.7% | 6.9% | 0% | 0% |
| Catalyst Neutralization | | | | |
| Height 1 | 18.5% | 8.1% | 0.0% | 4.9% |
| (Top of the Catalyst Bed) | | | | |
| Height 2 | 20.3% | 10.6% | 0.8% | 17.8% |
| Height 3 | 26.0% | 37.6% | 10.0% | 29.0% |
| Height 4 | 25.7% | 38.9% | 63.8% | 36.6% |
| Height 5 | 25.1% | 33.9% | 51.7% | 41.0% |
| Height 6 | 22.8% | 27.0% | 26.0% | 12.6% |
| (Bottom of the Catalyst Bed) | | | | |

The results in Table 3 show that the ion exchange catalysts in Examples 3 and 4 were more evenly neutralized with the promoter than that in the Comparative Examples A and B. In Example 3, the uniform distribution of the promoter was much more rapidly achieved because the water was recirculated at a sufficiently high upflow velocity.

The bed expansion in Example 4 was lower than that in Example 3. The ion exchange resin catalyst was less uniformly neutralized in Example 4 than in Example 3. However, the catalyst neutralization uniformity of Example 4 was better than that of Comparative Examples A and B. In Comparative Examples A and B, no bed expansion was observed.

The results in Table 3 confirm that a uniform distribution of the promoter to partially neutralize the ion exchange resin catalyst can be achieved at a sufficiently high upflow velocity.

Example 5

An ion exchange resin catalyst reactor having a volume of 26 m$^3$ was filled with 22 m$^3$ of water-wet Dowex™ 50WX4 catalyst. Acidified water comprising 0.039 moles/liter phosphoric acid was introduced into the reactor and recirculated through the reactor in an upflow direction.

In this example, a surge drum was used to manage the change in liquid volume during promoter addition, a bag filter was used to remove fine catalyst particles from the recirculating water, and a centrifugal pump was used to recirculate the water.

The flowrate of the recirculating water was measured and converted to velocity according to the Formula (2) described in Example 1. The resultant velocity was 5.8 m/hr. The bed expansion achieved at this velocity was estimated to be about 14% according to Table 1 described in Example 1.

The promoter comprising 950 kilograms of 2,2'-dimethylthiazolidine was added to the recirculating water over a period of 19 hours. After the addition of the 2,2'-dimethylthiazolidine was complete, the water continued to recirculate for about 20 more hours. Samples of the catalyst were taken from the side of the reactor through sample valves and measured for percent neutralization by titration according to the method described in Example 3. The results show that the catalyst neutralization for these samples were in the range of from 18.6% to 19.2%, which is within ±0.3% from the average neutralization of 18.9%.

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the process of the present invention is not to be limited by the specific examples set forth above including the tables to which they refer. Rather, these examples and the tables they refer to are illustrative of the process of the present invention.

What is claimed is:

1. A method of preparing an ion exchange resin catalyst comprising:
   (a) partially filling a vessel, from 50 volume percent to 95 volume percent of said vessel, with an ion exchange resin catalyst to form an ion exchange resin catalyst bed in the vessel;
   (b) introducing a liquid into the vessel;
   (c) recirculating the liquid through the catalyst bed in an upflow direction;
   (d) introducing a promoter into the recirculating liquid; and
   (e) maintaining the recirculating liquid at a velocity in a range of from 0.5 meters (m)/hour (hr) to 100 m/hr sufficient to achieve at least 5 percent catalyst bed expansion and mobilize the ion exchange resin catalyst to evenly and rapidly distribute the promoter throughout the catalyst bed.

2. The method according to claim 1 comprising partially filling from 70 volume percent to 90 volume percent of the vessel with the ion exchange resin catalyst before introducing the liquid.

3. The method according to claim 1, wherein the promoter is introduced in a quantity sufficient to at least partially neutralize the ion exchange resin catalyst.

4. The method according to claim 3, wherein the promoter is introduced in a quantity sufficient to neutralize from 5 percent to 50 percent of the ion exchange resin catalyst.

5. The method according to claim 1, wherein the promoter is introduced to the recirculating liquid in more than one step.

6. The method according to claim 5, wherein the promoter is introduced to the recirculating liquid in a time period of from 0.5 hour to 5 days.

7. The method according to claim 1, wherein the promoter is a bound promoter type.

8. The method according to claim 7, wherein the promoter comprises an amino group; or an amino group and a thiol group.

9. The method according to claim 1, wherein the liquid comprises water or acidified water.

10. The method according to claim 9, wherein the acidified water comprises an acid of HCl, $H_2SO_4$, phosphoric acid, alkyl sulfonic acids, aromatic sulfonic acids, formic acid, acetic acid, oxalic acid, or any combination thereof.

11. The method according to claim 9, wherein the acidified water comprises an acid in a concentration of from 0.001 molar to 5 molar.

12. The method according to claim 11, wherein the promoter has a molar concentration in the water that is less than the molar concentration of the acid in the water.

13. The method according to claim 1, wherein the method is carried out at a temperature of from 0° C. to 100° C.

14. The method according to claim 1, wherein the promoter comprises a thiazolidine, a pyridine alkane thiol, or a mixture thereof.

15. The method of claim 14, wherein the thiazolidine comprises 2,2'-dimethylthiazolidine.

16. The method of claim 14, wherein the pyridine alkane thiol comprises 4-pyridine ethane thiol.

* * * * *